United States Patent [19]
Follett

[11] Patent Number: 4,883,620
[45] Date of Patent: Nov. 28, 1989

[54] METHOD OF FABRICATION OF A DISINTEGRATING CASTING WEIGHT AND FISH ATTRACTOR

[76] Inventor: John L. Follett, 14554 Richmond Ave., Fair Haven, N.Y. 13064

[21] Appl. No.: 220,999

[22] Filed: Jul. 15, 1988

Related U.S. Application Data

[60] Continuation-in-part of Ser. No. 17,481, Feb. 24, 1987, abandoned, which is a division of Ser. No. 717,039, Mar. 28, 1985, Pat. No. 4,663,881.

[51] Int. Cl.$^4$ .............................................. B28B 1/08
[52] U.S. Cl. ........................................ 264/72; 29/458; 249/97; 264/86; 264/278; 264/297.8
[58] Field of Search ............. 264/71, 72, 333, 297.8, 264/297.9, 271.1, 278, 279, 86, 275; 43/43.12, 43.14, 42.53; 249/94, 97, 121; 425/126 S; 29/458

[56] References Cited

U.S. PATENT DOCUMENTS

| | | | |
|---|---|---|---|
| 1,711,369 | 4/1929 | Wade | 249/97 |
| 2,687,592 | 8/1954 | Purcell | 43/43.12 |
| 2,791,860 | 5/1957 | Mecate et al. | 43/43.12 |
| 3,319,698 | 5/1967 | Starnes | 249/97 |
| 3,393,467 | 7/1968 | Potter et al. | 43/43.12 |
| 3,415,005 | 12/1968 | Gilham | 43/43.12 |
| 3,834,059 | 9/1974 | Overstreet | 43/43.12 |
| 4,105,729 | 8/1978 | Helmrich et al. | 264/71 |
| 4,186,907 | 2/1980 | Snodgrass | 249/94 |
| 4,420,525 | 12/1983 | Parks | 264/256 X |
| 4,501,083 | 2/1985 | Ong | 43/4.5 |

FOREIGN PATENT DOCUMENTS

| | | | |
|---|---|---|---|
| 1054574 | 10/1953 | France | 43/43.12 |
| 1434734 | 5/1976 | United Kingdom | 264/71 |

*Primary Examiner*—Jan H. Silbaugh
*Assistant Examiner*—Karen D. Kutach

[57] ABSTRACT

A method of making a water soluble weight, the weight being of the type for attachment to a fishing line, hook or lure by means of a closed loop of thread or string embedded in and extending from the weight, is provided. The weights are formed by filling appropriately shaped cavities in a mold with a mixture consisting essentially of water, soil (preferably a silt-loam mixture or silty clay loam) and sand size stone. The mold rests upon a layer of resilient material (e.g., sponge rubber) which in turn is attached to a rigid layer mounted by resilient means upon a base plate. Openings in the resilient layer overlie recesses in the rigid layer, the openings and recesses being aligned with openings in the bottom of each mold cavity to permit insertion, with the aid of a tool having a notched end, of the thread or string through the mixture in the mold cavity into the underlying recess. The mold apparatus is attached to a shaker table and vibrated, both before and after insertion of the string, and a blotter material is placed over the mold, in contact with the upper surface of the mixture, which is then dried and removed from the mold cavities. An additional material, such as fish attracting food and/or scent, may be incorporated in the weights prior to drying.

14 Claims, 3 Drawing Sheets

U.S. Patent   Nov. 28, 1989   Sheet 1 of 3   4,883,620
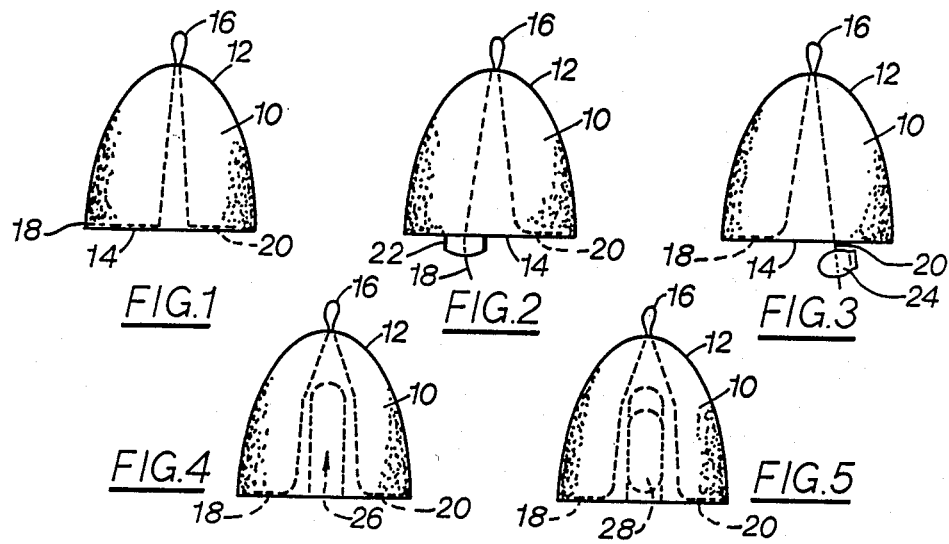
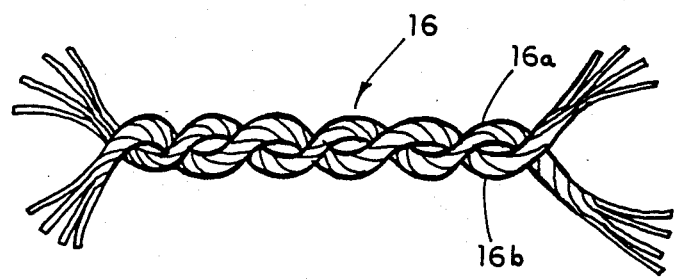
FIG. 9

METHOD OF FABRICATION OF A DISINTEGRATING CASTING WEIGHT AND FISH ATTRACTOR

RELATED APPLICATIONS

This is a continuation-in-part of copending U.S. application Ser. No. 017,481, filed 02/24/87, now abandoned, which was filed as a division of U.S. application Ser. No. 717,039, filed 03/28/85, now U.S. Pat. No. 4,663,881, granted May 12, 1987.

BACKGROUND OF THE DISCLOSURE

The present invention relates to disintegrating, i.e., water soluble, casting weights for attachment to fishing lines, hooks or lures and to novel methods and apparatus used in the fabrication thereof. More particularly, the invention relates to dissolving casting weights of improved qualities and construction, as well as molding apparatus and techniques useful in the fabrication of the improved weights.

In many types of fishing situations it is necessary or desirable to add weight to the hook-carrying end of the line to assist in casting the hook to a point in the water at some distance from the fisherman. Where it is desired for the hook to remain submerged, the weight may be attached in a permanent or semi-permanent manner to provide a "sinker" as well as a casting weight. However, such weights are unsuitable where the hook is to be located at or near the surface during fishing.

A number of types of casting weights have been proposed which dissolve or otherwise disintegrate upon, or a short time after, contact with the water. Among the materials used for such weights are ice (see U.S. Pat. Nos. 3,415,005 and 4,186,907) and compositions of various substances with a binder such as cornstarch or sugar (see U.S. Pat. Nos. 3,393,467 and 3,834,059). Also, various means have been employed to secure such weights to the fishing line, hook or lure. However, the disintegrating casting weights of the prior art have been subject to a number of limitations, among the most serious of which is that they are not suitable for fly fishing using spin casting equipment with light, monofilament line.

It is a principal object of the present invention to provide a method of making a fishing line casting weight of the water soluble type having improved qualities of initial hardness, shape retention and avoidance of disintegration, while dissolving rapidly with fish-attracting properties upon entering the water.

Still another object is to provide novel and an improved method useful in the fabrication of solid, water-soluble, casting weights for attachment to a fishing hook, line or lure from an initially moldable mixture.

Other objectives will in part be obvious and will in part appear hereinafter.

SUMMARY OF THE INVENTION

The casting weight and a fish attractor made by the method of the present invention preferably has a substantially hemispherical shape with one end flat and one rounded. A closed loop of thread or string, preferably of a material which will sink in water and is biodegradable, extends from the rounded end, at least a major portion of the length of the string being embedded within the weight. The composition of the weight is entirely sand size pieces of stone, preferably from at least 50% to about 85%, and the remainder a natural soil such as silt, loam and/or clay, or a combination thereof.

According to the present invention there is provided a method of fabricating a fish attracting casting weight which includes the steps of preparing a moldable mixture of water, soil and sand size stone, and preparing a mold having an upper opening and a surface defining a substantially hemispherical cavity with a lower opening extending through the mold at an apex of the hemispherical cavity defining the surface. The method further includes the steps of positioning the mold with the apex facing downward and filling the cavity with the mixture such that the mixture includes an upper surface. The mold is then subjected to a first vibration to compact the mixture in the cavity. A length of flexible material having free ends and a medial portion is inserted into the compacted mixture through the upper surface of the compacted mixture and out through the lower hole opening such that the free ends of the flexible material extend out of the upper surface of the compacted mixture and the medial portion forms a small, closed loop extending out of the mold through the lower opening. The mold is subjected to a second vibration to compact the mixture about the flexible material, and the compacted mixture is then dried to remove substantially all of the water therefrom and to fabricate the casting weight. The casting weight with a flexible material embedded therein is then removed from the cavity.

In a specific embodiment of the invention, an additional step is carried out which includes placing a layer of liquid absorbent material over the upper opening of the mold and in contact with the upper surface of the compacted mixture after the second vibration. The absorbent material may be pressed into engagement with the upper surface of the compacted mixture with a resilient roller or such, thereby embedding the free ends of the flexible material into the upper surface of the compacted mixture.

According to one embodiment of the invention, the soil is formed from a silt-clay-loam mixture. The clay preferably comprises illite. Also the finished product has superior characteristics if the soil mixture includes $CaCO_3$, which may occur naturally in the silt or can be added to the mixture.

BRIEF DESCRIPTION OF THE DRAWINGS

FIG. 1 is an elevational view of the casting weight and fish attractor in a preferred embodiment;

FIGS. 2-5 are elevational views of various modified forms of the weight;

DETAILED DESCRIPTION

Figure 6:
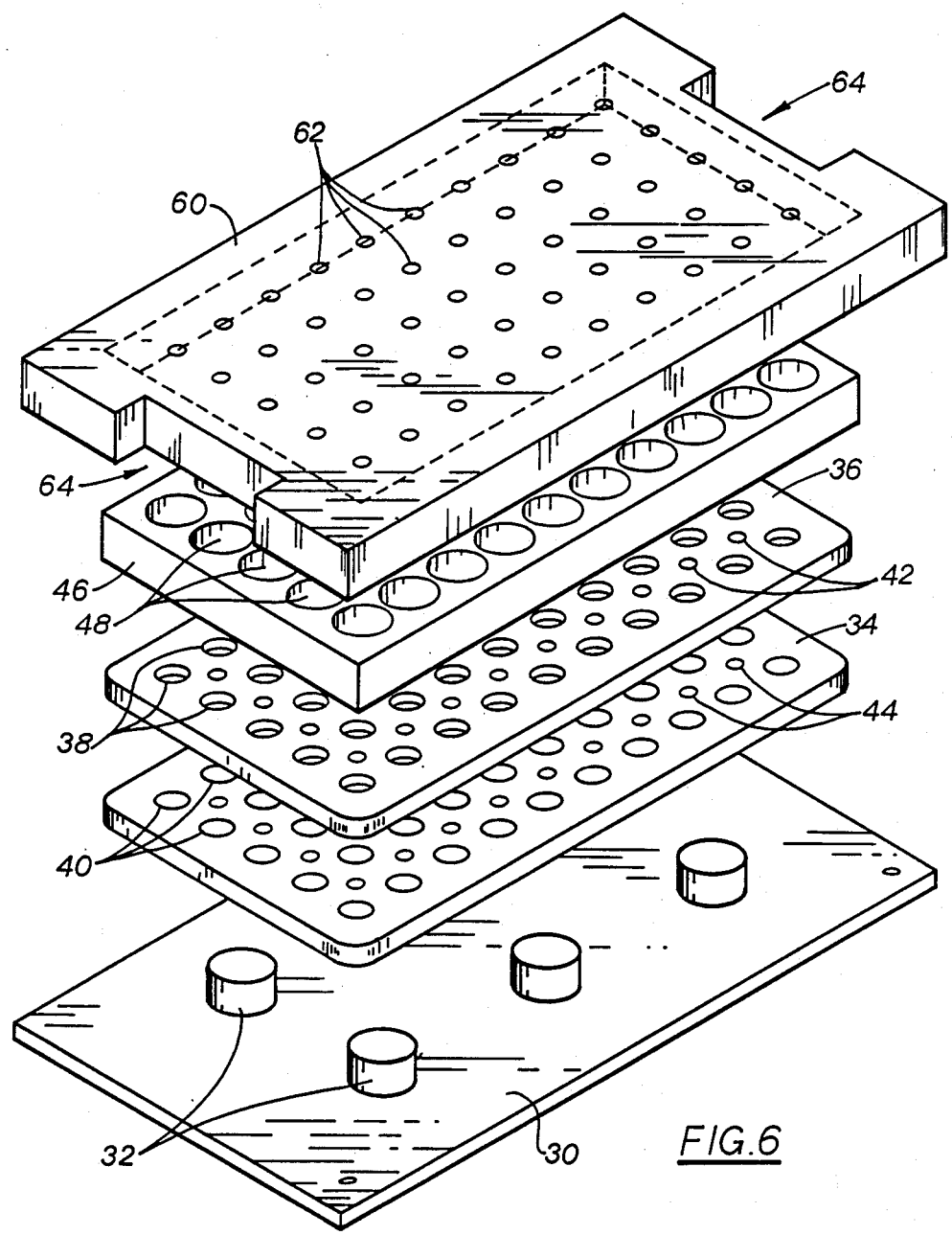
FIG. 6 is an exploded, perspective view of a preferred form of apparatus for use in fabricating weights such as those shown in FIGS. 1-5.

Referring now to the drawings, in FIG. 1 is shown a representative example of the article of the manufacture of the invention, namely, a casting weight and fish attractor for attachment to a fishing line, hook or lure. The weight includes a solid body portion 10 of substantially hemispherical shape, having rounded end 12 and flat surface 14. A flexible material such as a length of thread or string (hereinafter referred to as string) includes closed loop portion 16 extending from rounded end 12 and portions 18 and 20 extending out from flat surface 14 or, preferably, fully or partly embedded in such surface substantially as shown in FIG. 1. The preferred material forming body portion 10, as well as methods and apparatus employed in the fabrication thereof, will be discussed in detail later herein.

In use, the hook attached to the end of a fishing line or leader, either directly or by being affixed to a fly, lure or other artificial bait, is placed through closed loop 16. The hook and bait may then be cast or thrown a considerably greater distance and placed with greater accuracy by virtue of the momentum provided by the weight of body portion 10, such weight being on the order of ¼ ounce or greater, as desired. Upon entering the water, body portion 10, by its water soluble nature, begins to dissolve and is released from the hook after a few seconds, the time period being selectively variable in accordance with the nature of body portion 10, as also discussed later herein.

In FIGS. 2 and 3 are illustrated modified forms of the weight for use when it is desired to insure that the string will be disengaged from the hook after body portion 10 disintegrates. In FIG. 2, one of end portions 18 and 20 is not embedded in surface 14, but extends therefrom for attachment of additional string removing means. A slow dissolving material (i.e., slower than body portion 10) such as a gelatin is provided in the nature of saucer shaped disc 22, applied at time of manufacture, in initially liquid form to surface 14, surrounding and attaching to end portion 18. Thus, when body portion 10 dissolves, disc 22 forms a water anchor or drag, causing the string to disengage from the hook, when the line is retrieved. In the modification of FIG. 3, a conventional, soft metal, pinch-on sinker 24 is secured to end portion 20, which is preferably initially embedded in the end of the weight, as in FIG. 1, and pulled free for attachment on sinker 24. Sinker 24 provides additional weight as well as insuring that the string will disengage from the hook after disintegration of body portion 10. The embodiments of both FIGS. 2 and 3 are particularly useful in fly fishing, as when very light lures or flies are used, especially with monofilament line, both to provide the necessary weight and to submerge an artificial insect of the type which is initially submerged and rises to the surface, or remains submerged.

Since the nature of body portion 10 and the manner of fabrication thereof, as described later, causes bubbles to form and rise in the water as the weight dissolves, this serves as a natural attractant for many types of fish. An important aspect of the invention, however, has been found to be the effect of the rile which is dispersed in the water from the disintegrating body. The rile rising from the body may be carried by currents in the water, and fish some distance from the body, on detecting the rile in the water will follow it to its source and thus encounter the lure or bait. In some situations, an additional attractant such as a natural fish food or extract thereof, and/or additional scent to which certain species of fish are attracted, may be added if desired. Body portion 10 may be formed with a cavity, such as that shown in FIG. 4 extending into surface 14 and denoted by reference numeral 26, so that a fisherman may inject or insert a fish attractant of his choice. Alternatively, attractant 28 may be incorporated in body portion 10, as shown in FIG. 5, during the fabrication thereof and may, if desired, be segregated from the material of body portion 10 by a suitable sealant.

In order to provide greater resistance against removal of the string from the disintegrating casting weight, the string may be a cord formed by two twisted strands 16a and 16b as shown in FIG. 9. Each main strand may be formed from a plurality of wound smaller strands. The mixture, while still in the moldable form, flows in between the strands so that after hardening, it clings to the cord with greater tenacity.

Turning now to FIG. 6, a preferred form of apparauus for fabricating the casting weights and fish attractors of the invention is shown. Rigid base plate 30 is attached by legs or pads 32, preferably of rubber or other resilient material, to rigid layer 34. Resilient layer 36, of sponge rubber or other like material, is cemented or otherwise secured to rigid layer 34 with a first array of openings 38 in resilient layer 36 in registration with a like array of recesses 40 in the upper surface of rigid layer 34. A second array of openings 42 in the resilient layer are aligned with openings 44 so that the openings 42 and 44 extend continuously through layers 34 and 36. Such openings may also extend through resilient pads 32 and base plate 30 if aligned therewith in layers 34 and 36.

Figure 7:
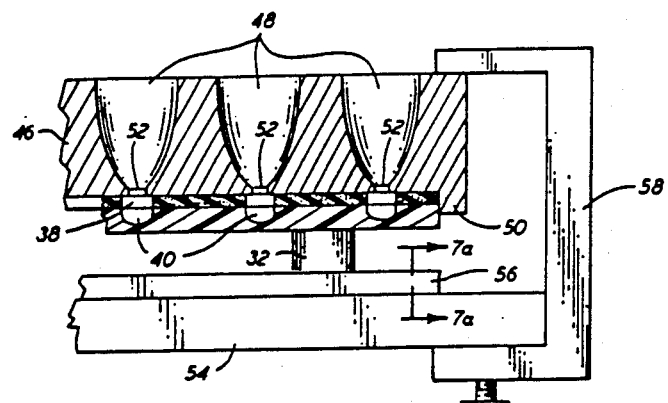
FIG. 7 is a fragmentary, side elevational view, in section, of a portion of the apparatus of FIG. 6 in the assembled condition.
Figure 7A:
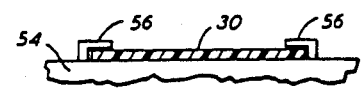
FIG. 7a is a small-scale cross section on the line 7a—7a of FIG. 7.

Mold member 46 is formed from a suitable plastic, or other material commonly used for such purpose, with an array of cavities 48 having a shape corresponding to the desired final shape of the casting weights, e.g., a substantially hemispherical or ovoid shape. The lower surface of mold member 46 is recessed to provide a peripheral border fitting the outside dimensions of layers 34 and 36, whereby the mold member may be placed upon resilient layer 36 with the latter fitting inside the peripheral border on the mold member, a portion of which is indicated in FIG. 7 by reference numeral 50. When so positioned, the center of each of mold cavities 48 is aligned with one of openings 38 and recesses 40.

Openings 52 extend through the lower side of mold member 46 at the center of the lower, curved surface of each of cavities 48. Thus, when mold member 46 is positioned on resilient layer 36 as described, mold openings 52 directly overlie openings 38 and recesses 40. The assembled items are placed on a conventional shaker table, a portion of which is indicated in FIG. 7 by reference numeral 54, provided in known manner with suitable oscillating or vibrating means (not shown). Base plate 30 is inserted between a pair of guide tracks 56 affixed to the table surface, and the apparatus is secured at each end to the table by clamps, one of which is indicated by reference numeral 58 in FIG. 7, pressing the lower surface of mold member 46 into sealing engagement with resilient layer 36.

Mold cavities 48 are then filled with the mixture from which the casting weights are formed. It has been found that the properties of the finished items are optimised by using a mixture consisting only of sand size particles of stone, (hereinafter referred to as aggregate) with a suitable, natural soil composition and sufficient water to render the mixture moldable. A suitable mixture has been prepared using aggregate, soil and water in approximate relative proportions of 60%, 25% and 15% (by weight) respectively. All, or substantially all, of the water is later removed by drying, leaving a finished item composed of approximately 70% aggregate and 30% soil. The aggregate is a stone preferably of a size small enough to pass a 10 mesh screen (10 openings per linear inch) and large enough not to pass a 30 mesh screen. The soil is a relatively fine silt-loam or silt-loam which may have some clay content and also some, but preferably little sand, and combinations thereof.

It has been found that a product having preferred characteristics is produced by using illite clay in a silty clay loam mixture. As an example, in a mixture which includes a clay content of about 14% by weight in the total finished product, and wherein illite clay is a dominate constituent of the clay, say about 80%, a more stable finished product is produced. Additionally, the presence of $CaCO_3$ in the soil mixture also provides a cementing affect in the product. The $CaCO_3$ further improves the bubble effect of the product as it disintegrates, and the bubbles, in addition to being a fish attractor, assist in the breaking up of the casting weight which break up would be somewhat slower when a significant amount of clay is used. A product found to have good characteristics is one which may contain about 14% clay by weight in the total product weight and about 16% $CaCO_3$ which can occur naturally. As a result of testing, it is believed that in excess of 20% of $CaCO_3$ by weight may be possible by using silt in which $CaCO_3$ occurs naturally. Alternatively, when using silt loam or silty clay loam mixtures, which do not contain any or have very little natural $CaCO_3$ content, it can be added in amounts up to 20 to 25% of the total weight.

After mold cavities 48 are filled the vibrating mechanism of shaker table 54 is actuated and an initial vibration imparted to the mold and its supporting apparatus so that the mixture is well settled in the cavities. Vibration is stopped, excess material is removed from the top surface of mold member 46 by passing a straight edge thereover with a reciprocating motion, and perforated plate 60 (FIGS. 6 and 8), formed of a transparent sheet of plastic or other rigid material, is placed on the upper surface of mold member 46. Plate 60 is larger in length and width than mold member 46 and is provided with a recess in the lower surface of the approximate dimensions of the mold member so as to fit thereon with each of openings 62 in plate 60 in registration with the center of mold cavities 48. Cut-out areas 64 in the ends of plate 60 are provided to accommodate clamps 58 so that the plate may lie flat on the surface of mold member 46.

Figure 8:
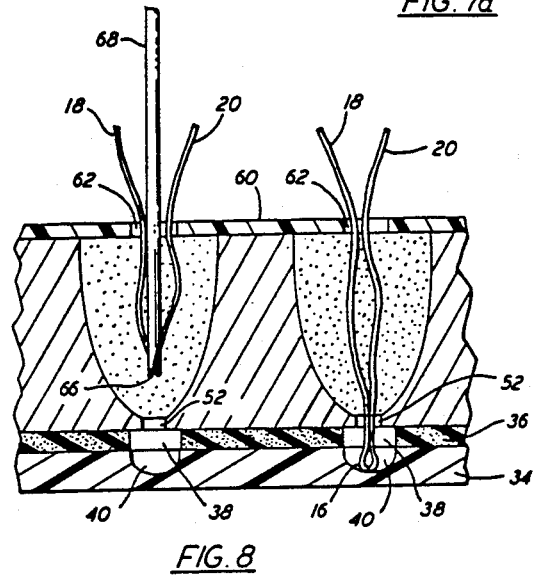
FIG. 8 is an enlarged, fragmentary, elevational view of portions of the apparatus, illustrating a step in the preferred method of fabrication of the weights; and, FIG. 9 shows a portion of a cord which is usable for the flexible material in the present invention.

The lengths of string are then inserted in the mixture in the mold cavities by engaging a medial portion of the string through notch 66 in the end of elongated rod 68. Openings 62 serve as a guide, through which the notched end of rod 68 is inserted. Rod 68 is forced downwardly, through the mixture of material in mold cavity 48, through opening 52 at the bottom of the mold cavity, opening 38 in resilient layer 36 and into recess 40 in rigid layer 34. When rod 68 is withdrawn, the string remains, forming closed loop 16 extending out of the lower, curved end of the material in the mold and free ends 18 and 20 extending out of upper, flat end, as indicated in FIG. 8. The resilience provided by layer 36 assists in the insertion of rod 68 and the proper seating of loop 16 in recess 40, for example, if solid material passes from the mold cavity into opening 38 and recess 40, resilient layer 36 may expand somewhat as rod 68 is forced downwardly to accommodate the rod end of loop 16. After the strings have been inserted through the material in all of the mold cavities, whether one at a time or several (or all) at once by simultaneous movement of a plurality of notched rods, plate 60 may be removed from the upper surface of mold member 46. The shaker table is then actuated again and the mold and supporting structure subjected to a second vibration for a suitable time to compact the mixture and to seat it firmly about the embedded string. A liquid absorbent material such as a layer of paper towels is then placed over the upper surface of mold member 46 which serves to place ends 18 and 20 in close contact with the upper surface of the material in the mold cavities, as well as to absorb some of the water which has risen to the surface during vibration of the mold apparatus. Preferably a roller of resilient material is passed a few times over the surface of the absorbent material, thereby embedding all or most of the string ends 18 and 20 in the upper surface of the material in the mold cavities.

Clamps 58 are then released and mold member 46 is removed from the supporting structure. Openings 42 and 44, extending continuously through layers 36 and 34 respectively, facilitate the removal of mold member 46 from resilient layer 36. A low pressure air spray may be passed over the lower surface of mold member 46 to remove any material which may have passed through the lower mold openings during vibration from closed loops 16 extending from the bottom of the mold member, but a preferable method is that of simply brushing the surface lightly with a bristle type brush. Actually, very little of the mixture will pass through openings 52 and 38, which is preferred, due to the seal between mold member 46 and resilient layer 36. The material in mold cavities 48 is then dried, removing essentially all of the water, by placing mold member 46, with the absorbent layer still in place, in an oven or other drying chamber for a suitable time period. It will be noted that mold member 46 rests upon peripheral border 50 during the drying operation, permitting loops 16 to extend freely from the lower surface of the mold and remain open. After drying, the absorbent layer is removed and the finished items are removed from the mold by inverting and tapping it, such as with a small mallet.

What I claim is:

1. A method of fabricating a fish attracting casting weight comprising:
   (a) preparing a moldable mixture of water, soil and sand size stone;
   (b) preparing a mold having an upper opening and a surface defining a substantially hemispherical cavity with a lower opening extending through said mold at an apex of said hemispherical cavity defining surface;
   (c) positioning said mold with said apex facing downward;
   (d) filling said cavity with said mixture such that said mixture includes an upper surface;
   (e) subjecting said mold to a first vibration to compact said mixture in said cavity;
   (f) inserting a length of flexible material having free ends and a medial portion into said compacted mixture through said upper surface of said compacted mixture and out through said lower mold opening such that said free ends of said flexible material extend out of said upper surface of said compacted mixture and said medial portion forms a small, closed loop extending out of said mold through said lower opening;
   (g) subjecting said mold to a second vibration to compact said mixture about said flexible material;

(h) drying said compacted mixture to remove substantially all of said water therefrom and to fabricate said casting weight; and (i) removing said casting weight with said flexible material embedded therein from said cavity.

2. The method of claim 1 including an additional step of placing a layer of liquid absorbent material over said upper opening of said mold, in contact with said upper surface of said compacted mixture, after said second vibration.

3. The method of claim 2 including the further step of pressing said absorbent material into engagement with said upper surface of said compacted mixture with a resilient roller, thereby embedding said free ends of said flexible material into said upper surface of said compacted mixture.

4. The method of claim 3 wherein said drying step is carried out in a heated chamber with said absorbent material in place.

5. The method of claim 1, wherein said inserting step is performed by engaging said medial portion of said flexible material with one end of an elongated rod, passing said rod through said compacted mixture and said lower mold opening and withdrawing said rod, leaving said flexible material extending through said compacted mixture.

6. The method as defined in claim 1, wherein the preparing of said mixture includes the adding of soil in the form of a silt loam or silty clay loam.

7. The method as defined in claim 6, wherein said clay in said mixture includes illite clay or a clay in which illite clay is dominate.

8. The method as defined in claim 7, wherein $CaCO_3$ is present in the silt loam or silty clay loam mixture.

9. The method as defined in claim 8, wherein $CaCO_3$ is present in an amount of about 16% by weight of said silt loam or silty clay loam.

10. The method as defined in claim 1, including the step of adding $CaCO_3$ to said soil.

11. The method of claim 10, wherein $CaCO_3$ is added to said soil in an amount up to 25% by weight of said mixture.

12. The method as defined in claim 1, wherein said flexible material is in the form of a cord formed by two twisted main strands.

13. The method as defined in claim 1, and further comprising the step of attaching to one free end of said flexible material a small body forming a water anchor for assisting in disengaging said flexible member from a fishing hook.

14. The method as defined in claim 13, wherein said small body is formed of a slow dissolving material.

* * * * *